US006483598B1

(12) United States Patent
Narukawa et al.

(10) Patent No.: US 6,483,598 B1
(45) Date of Patent: Nov. 19, 2002

(54) IMAGE PROCESSING DEVICE

(75) Inventors: Atsushi Narukawa, Yamatokoriyama (JP); Fuminori Miyoshi, Nara (JP); Kenichi Maeda, Yamatokoriyama (JP); Hidenori Ohnishi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/915,962

(22) Filed: Jul. 26, 2001

Related U.S. Application Data (62) Division of application No. 09/362,814, filed on Jul. 28, 1999, now Pat. No. 6,281,978, which is a continuation of application No. 09/145,953, filed on Sep. 3, 1998, now Pat. No. 5,987,223.

(51) Int. Cl.$^7$ ............................ G06K 9/36; G06K 15/00
(52) U.S. Cl. ..................... 358/1.13; 382/237; 358/1.2; 358/1.9
(58) Field of Search .................... 382/237; 358/1.13, 358/1.2, 1.9, 262.1

(56) References Cited

U.S. PATENT DOCUMENTS

| | | | |
|---|---|---|---|
| 4,924,509 A | 5/1990 | Yokomizo | 382/50 |
| 4,933,772 A | 6/1990 | Ikenoue et al. | 358/300 |
| 5,267,330 A * | 11/1993 | Masuda | 382/51 |
| 5,282,059 A * | 1/1994 | Fukushima | 358/456 |
| 5,369,506 A | 11/1994 | Takeuchi | 358/455 |
| 5,438,648 A | 8/1995 | Takaoka et al. | 395/106 |
| 5,521,990 A | 5/1996 | Ishizawa et al. | 382/270 |
| 5,694,486 A | 12/1997 | Shigeeda et al. | 382/197 |
| 5,699,169 A | 12/1997 | Nakatani et al. | 358/298 |
| 5,748,774 A * | 5/1998 | Murata | 382/181 |
| 5,894,546 A * | 4/1999 | Yoshida | 395/117 |
| 5,987,223 A | 11/1999 | Narukawa et al. | 395/109 |

FOREIGN PATENT DOCUMENTS

| | | | | |
|---|---|---|---|---|
| JP | 2-56560 | | 2/1990 | |
| JP | 4-115667 | | 4/1992 | |
| JP | 404130583 | * | 5/1992 | G06F/15/62 |
| JP | 5-068121 | | 3/1993 | H04N/1/00 |
| JP | 7-105068 | | 4/1995 | H04N/1/00 |
| JP | 2525352 | | 5/1996 | |

* cited by examiner

*Primary Examiner*—Jerome Grant, II
(74) *Attorney, Agent, or Firm*—Dike, Bronstein, Roberts & Cushman IP Group Edwards & Angell, LLP; David G. Conlin; David A. Tucker (57) ABSTRACT

An image processing portion for conducting the specified processing of an image to be reproduced by an image forming portion based on the processed image data is constructed as a single control portion. Consequently, the development of a variety of digital copying machines requires preparation of specially designated control boards according to levels of the products. This makes machines expensive and requires users to pay a considerable initial cost. An image processing device of the present invention is provided with an image information inputting means for inputting image information as a first level image, a main image-processing board for conducting the specified processing of the input image information of the first revel image, a sub image-processing board for conducting the specified processing of the image information processed by the main image processing board and outputting the information as a second level image, and a means for reproducing an image according to the image information processed by the main image-processing board or the sub image-processing board. These boards are independent from each other in the circuit configuration.

7 Claims, 3 Drawing Sheets

FIG.1

IMAGE PROCESSING DEVICE

This application is a Division of U.S. patent application Ser. No. 09/362,814, entitled IMAGE PROCESSING DEVICE, filed Jul. 28, 1999 (now U.S. Pat. No. 6,281,978); which application in turn was a continuation of U.S. patent application Ser. No. 09/145,953, entitled IMAGE PROCESSING DEVICE, filed Sep. 3, 1998, (now U.S. Pat. No. 5,987,223) both by Narukawa, et al. (the inventors of this divisional application).

BACKGROUND OF THE INVENTION

The present invention relates to an image processing device such as a digital copying machine that conducts specified processing of image information read from an original by a scanning portion or image information transmitted over a communication channel from the outside and outputs a processed image by a printer portion.

Recently, the spread of digital data processing apparatuses such as personal computers, digital camera and portable information terminals using the digital technology has been accelerating globally. In the market for copying machines, many manufacturers are offering digital copying machines that can digitally process original images and output digital image information to meet an increasing demand of users for devices realizing easy reproduction and high-quality printing of photographs and originals without deterioration of the initial image quality.

The market circumstance stimulates manufactures to put on the market multifunctional digital copying machines that have facsimile and printer functions allowing multiple access.

However, the digital copying machines are expensive as compared with conventional analog copying machines because the digital machines must electrically read an original image and process the read image in the form of electronic data.

Namely, the digital copying machine is a combination of expensive components such as a reading device for electrically reading an original image, an image processing device for processing the electrically read image as electronic data and an optical scanning type recording device (e.g., a laser scanner) and so on. Therefore the further spread of the digital copying machines (e.g., a replace from the conventional analog machines or a increase of the digital machines) now slows down.

The image-processing portion in particular is very expensive and increases a total cost of the digital copying machine.

Japanese Laid-open Patent Publication No. 62-82768 discloses an image processing device which is capable of high-speed processing of high-resolution image data by using a printer control section composed of a print head control portion having a first CPU for modulating beams in accordance with image data, an electrophotographic control portion having a second CPU for controlling an electrophotographic process to reproduce an image on paper, an interface control portion having a third CPU for syncronizing the operation of the printer-head control portion with the operation of the electrophotographic control portion.

The publication describes a method whereby an image forming device has a plurality of control units used for control of respective working portions of the device and is provided with a specific timing control portion for assuring synchronous operations of the control units.

The technical content of the above Publication consists in that image-processing portion for conducting processing of an image according to image data from an image forming portion is constructed as a single control unit.

To supply a variety of the digital copying machines, it is therefore necessary to prepare specific control boards depending upon the specifications of the goods. This may burden users with an increased initial cost of the goods and manufactures with time and cost of development. The need for additional control for synchronizing the respective processing portions is also a problem in costs.

Accordingly, the present invention is directed to a variety of digital copying machines from an inexpensive standard type copying machine capable of producing high-quality copies to a high-grade digital copying machine provided with a variety of functions, which are developed on a basis of a digital copying machine having minimum necessary functions, which can be modified with separate options of components for specific digital image processing functions to satisfy all the market demands and users' needs.

SUMMARY OF THE INVENTION

It is an object of the present invention to provide a digital copying machines that can be modified by adding options whenever user requests.

It is another object of the present invention to provide an image processing device which comprises an image information inputting means for inputting image information as a first level image, a first image-processing means for conducting specified processing of he image information inputted as the first level image, a second image-processing means for receiving the image information processed by the first image-processing means and conducting specified processing of the image information as a different second level image and an image-information reproducing means for reproducing an image from the image information processed by the first image-processing means or the second image-processing means and is featured in that the first image-processing means and the second image-processing means are formed separately from each other in the circuit configuration.

It is another object of the present invention to provide an image processing device in which the first image-processing portion is provided with an image-writing control portion for control of image information writing by the image-reproducing means.

It is another object of the present invention to provide an image processing device in which the first image-processing portion is provided with a central processing unit for control of the first image-processing portion and the second image-processing portion.

It is another object of the present invention to provide an image processing device in which the image information inputted from the image-information inputting means and processed by the first image-processing means is multivalued-image information and the image information processed by the second image-processing means is binary image information.

It is another object of the present invention to provide an image processing device in which the second image-processing means is further provided with an input portion for receiving an image transmitted from a facsimile and/or a printer and the facsimile image or the printed image inputted through the input portion is processed as a binary image.

PREFERRED EMBODIMENT OF THE INVENTION

Referring to accompanying drawings, preferred embodiments of the present invention will be described below in detail.

Figure 1:
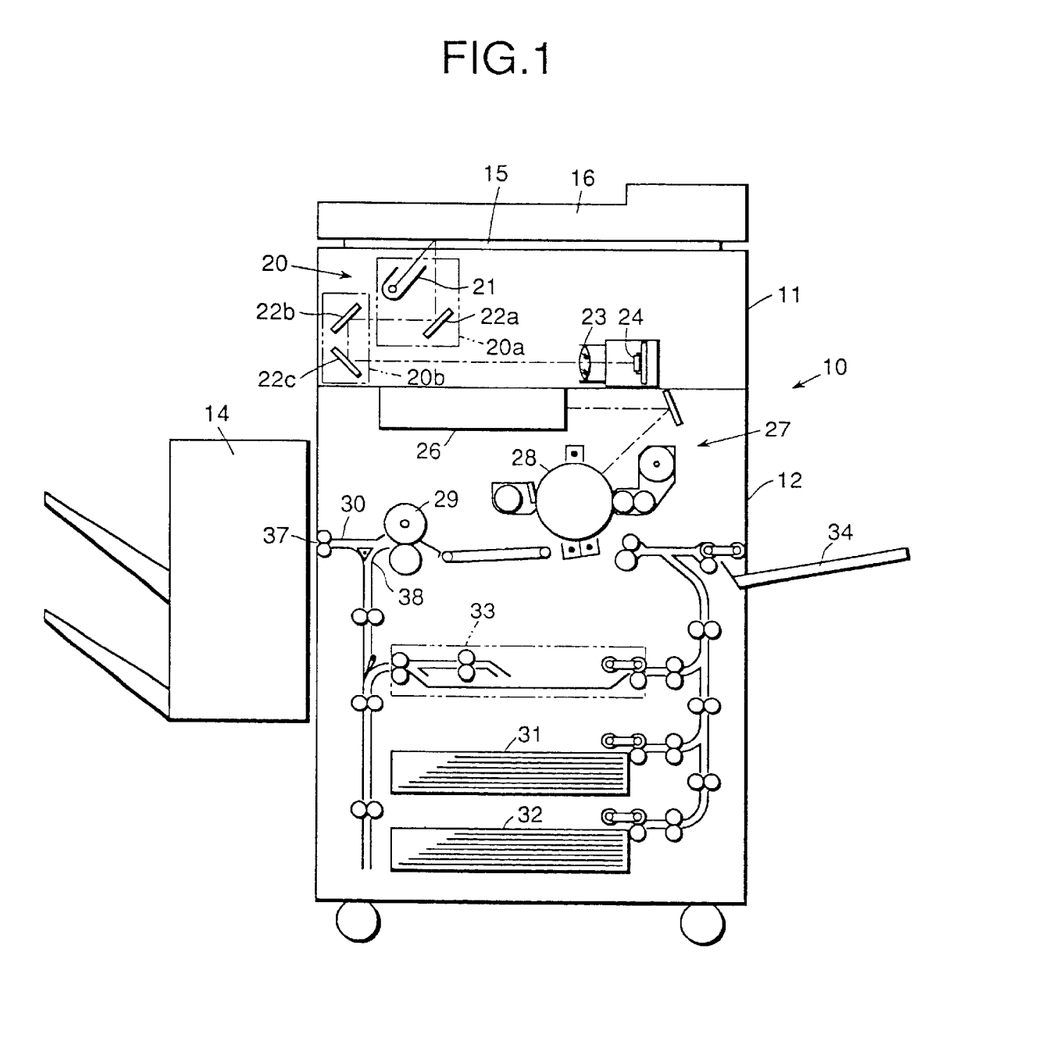
FIG. 1 is a sectional construction view of a digital copying machine that is an image processing device according to an aspect of the present invention.

FIG. 1 is a sectional view showing an entire system of a digital copying machine.

As shown in FIG. 1, the digital copying machine 10 is composed mainly of a scanner section 11 and a laser recording section 12.

The scanner section 11 consists of a document setting table 15 made from a transparent glass, a both-sides automatic document feeder (RADF) 16 for automatically transferring document to the document setting table 15 and a scanner unit 20 (document image reading unit) for reading an image of the original document set on the document setting table 15. The original image read by the scanner portion 11 is transferred as image data to an image inputting portion (described later).

A paper storing/feeding portion has a first cassette 31, a second cassette 32, a both-sides copying unit 33 and a multi-format paper feeding tray 34.

The cassettes accommodate piles of different format-size sheets of recording paper respectively. When a user selects a desired cassette, paper sheets of the desired format size will be fed periodically one by one from the top of the pile in the cassette and transferred along a paper feeding path 35 to an image forming portion of the laser printer section 12. The RADF 16 is a document feeding device that automatically feeds originals one by one at due time-intervals from a plurality of original documents put on a document feeding tray to the document setting table 15 of the scanner unit 20.

The RADF 16 has two different document-transporting paths one for one-side-printed documents and the other for both-side-printed documents, which paths can be selected using selecting means by a user. This RADF 16 uses a known art and will not be further explained.

The scanner unit 20 consists of:

a first scanning unit 20a including a lamp reflector assembly 21 for illuminating the surface of an original document and a first reflecting mirror 22a for reflecting the reflected (image) light from the original document toward a photoelectric conversion element (i.e., a charge coupled device CCD) 24;

a second scanning unit 20b including a second and third reflecting mirror 22b and 22c for directing the reflected light (of the original document image) to the CCD 24; an optical lens 23 for imaging the reflected light image of the original document on the surface of the CCD 24; and the CCD 24 for converting the received image into an electrical image signal.

In the scanner section 11, a document to be read is placed on the document setting table 35 and scanned by the scanner 20 moving along the bottom surface of the table. This is realized by th scanner unit 20 in cooperation with the RADF 16.

Image data obtained by reading the original image by the scanner unit 20 is transferred to an image processing section (to be described later) that in turn processes the received image data and transmits the processed image data to a laser recording unit 26. The image data is then reproduced as a visible image on a light-sensitive drum 28, transferred to the paper and fixed thereon through the electrophotographic (xerographic) process.

The laser printer section 12 is provided with paper storing/feeding portion, laser writing unit 26 and an electrophotographic processing unit 27 for forming an image.

The laser writing unit 26 includes a semiconductor laser capable of emitting laser light corresponding to the image data recorded in the memory, a polygonal mirror for deflecting the laser light at an equiangular-velocity and a lens f-θ for correcting the laser light deflected at the equiangular-velocity so that the laser light may be deflected at an equivelocity on the light-sensitive drum 28 of the electrophotographic process portion 27.

The electrophotographic processing portion 27 includes a light-sensitive drum 28 around which an electrically charging means, a developing means, a toner-image transferring means, a paper stripping means, a cleaning means, electrically discharging means, and a toner-image fixing device 29 are disposed according to a known arrangement. A paper transporting path is provided downstream at the outlet of the toner-image fixing device 29 and branches into a path 37 extending to a post-processing device 14 and a path 38 extending to a both-sides copying unit 23.

According to image data read from the image memory, the laser unit 26 emits and scans laser light to form a latent image on the light-sensitive drum 28. The latent image on the drum is developed with toner and transferred onto a paper sheet fed from a multistage paper-feeding portion. The toner image is fixed by heat on the paper sheet while passing the fixing device.

The paper sheet with a toner image fixed thereon passes the outlet of the fixing device 29 and is delivered via the path 30 to the post-processing unit 14 or via the path 38 to a cassette 33 for paper-sheets to be further printed on its reverse side.

Figures 2, 2A:
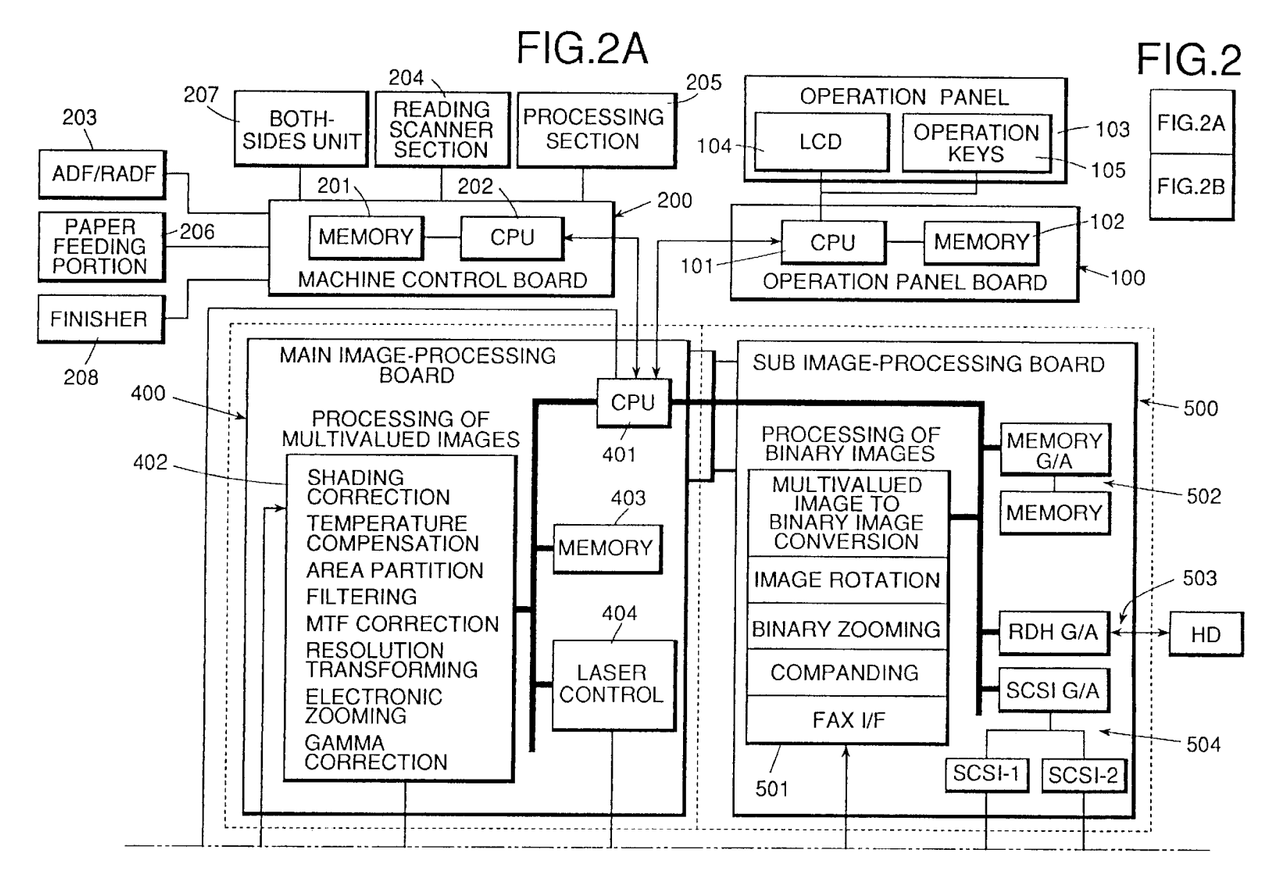
FIG. 2 shows the correct alignment of the drawing sheets for FIGS. 2A and 2B.
FIGS. 2A and 2B are block diagram showing a procedure of image processing of image data in a digital copying machine that is an image processing device according to an aspect of the present invention.
Figure 2B:
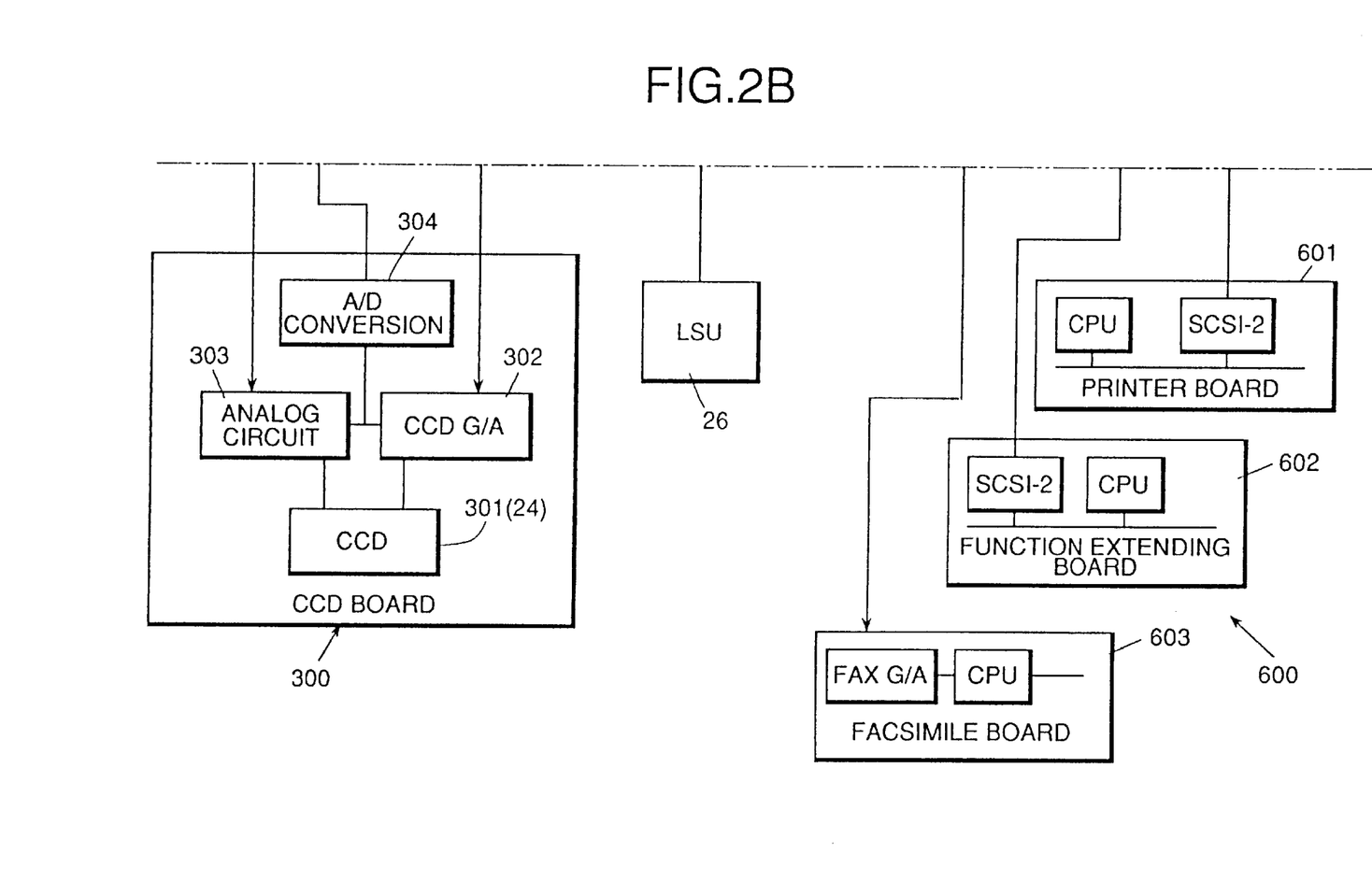

The construction and functions of an image processing portion for conducting processing of image information read from an original in the digital copying machine 10 will be described below:

FIGS. 2A and 2B are block diagram showing a whole construction of the component units and an image processing portion included in digital copying machine 10 shown in FIG. 1. A main central processing unit (CPU) 401 disposed at the center of the components controls the operation of the whole system in cooperation with central processing units (CPU) of respective component units of the machine.

As shown in FIGS. 2A and 2B, the control system is composed mainly of an operation-panel board 100 shown above right for control of an operation panel, a machine control board 200 disposed above left for control of component units of the digital copying machine 10, a CCD board 300 shown below left for control of electrically reading an image from an original converting the image into electronic data, an image processing board 400 shown at the center for carrying-out the particular processing of the electronic image data from the CCD board 300, a sub image-processing board 500 for carrying-out the particular processing of the image data from the main image-processing board, original image and a group of extended boards 600 (e.g., a printer board, a facsimile board, a extended function board) shown below right and connected through an interface to the sub image-processing board 500.

The control actions of the respective control boards will be described as follows:

(Operation Panel Board)

The operation panel board 100 is basically controlled by a sub central processing unit (CPU) 101 and controls input operations from an LCD display 104 and from operation keys 105 on the operation panel 103. A memory 102 is provided for storing data input from the operation keys 105 and various kinds of control information to be displayed on the LCD 104 on the operation panel.

In this arrangement, the sub-CPU 101 receives and transmits control data from/to the main control CPU 401 and controls actions of the digital copying machine 10. The main CPU 401 transfers a control signal showing a current working state of the digital copying machine 10 to the sub-CPU 101 that indicates the current state of the machine on a screen of the LCD 104.

(Machine Control Board)

The machine control board 200 works under the control of the sub-CPU 201 and controls the operation of an automatic document-feeder 203 (ADF/RADF), a reading scanner section 204 for reading a document image, a processing section 205 for reproducing an image from image information, a recording paper feeding section 206 for periodical feeding a recording paper sheet from a sheet-cassette to the processing section 205, a both-side printing unit 207 for reversing a paper sheet printed surface down and feeding it to the processing section 205 for printing the reversed surface of the paper sheet, and a finisher 208 for conducting post-processing (e.g., stapling) of the printed paper sheets.

(CCD board)

The CCD board 300 includes a charge-coupled device (CCD) 301 for electrically reading an image from an original document, a CCD driving circuit (CCD gate array) 302 for driving a CCD 301, an analog circuit 303 for adjusting a gain of analog data and an analog-to-digital converter 304 for converting analog data from the CCD 301 to digital signals and outputting the digital signals as electronic data for further processing. The CCD board 300 works under the control of the main CPU 401.

(Main Image-processing Board)

The main image-processing board 400 works under the control of the main CPU 401. It includes a multivalued image-processing portion 402 for receiving the electronic data of the original image and processing the data in the multivalued state so as to represent a desired gradation of the image through steps of shading correction, optical-density correction, area separation, filtering, MTF correction, resolution transform, electronic zooming (variable-power processing) and gamma correction steps, a memory 403 for storing processed image data and/or various kinds of control data for processing, and a laser control unit 404 for control of transferring the processed data to a laser writing unit 26 for reproducing the original image according to the processed electronic data.

(Sub Image-processing Board)

The sub image-processing board 500 is connected through a connector to the main image-processing board 400 and includes a binary-image processing unit 501 controlled by the main CPU 401 provided on the main image processing board, a memory for storing binary processed image information and/or control data for processing, a gate array 502 for control of the memory, a hard disk for storing information of a plurality of original images to be repeatedly read out for copying the desired number of copy products, a gate array 503 for control of the hard disk a SCSI as external interface, a gate array 504 for control of the SCSI.

The binary-image processing unit 501 is composed of a converting portion for converting multivalued image-information into binary image information, an image-turning portion for rotation of an image, and a zooming processing portion for changing a scale factor of the binary image. It is also provided with a facsimile interface for receiving and transmitting a facsimile image over a communication line.

(Extended Boards)

The extended board group 600 is composed of, e.g., a printer board 601 for receiving data from a personal computer and outputting the same in printer mode from a printing section of the copying machine, a function expanding board 602 for expanding edit-functions of the digital copying machine for further effective use of the features of digital printing, and a facsimile board 603 for enabling image-information transmitted from a remote terminal to be output from the printer of the digital copying machine.

The image processing operation of the image-processing device for the digital copying machine will be described below in copier, facsimile and printer modes respectively.

(Copier Mode)

In the digital copying machine 10, original documents put on the RADF 16 are automatically fed one by one to a document setting table 15 of the scanner unit 20. Each original document image is read and converted by the scanner unit 20 into 8-bit electronic data which is then transferred to the main image-processing board 400.

In the main image-processing board 400, the electronic data is processed as 8-bit electronic image data by the multivalued-image processing portion 402 according to a predetermined procedure.

The 8-bit electronic data subjected to the processing (e.g., gamma correction) is transferred through laser control portion 404 to the laser writing unit 26. The original image read by the scanner section 11 of the digital copying machine 10 is output as a copied image having a gradation from the laser recording portion 12.

(Electronic RDH Function in the Copy Mode)

Original documents put on the RADF 16 are automatically fed one by one to a document setting table 15 of the scanner unit 20. Each original image is read and converted by the scanner unit 20 into 8-bit electronic data that is then transferred to the main image-processing board 400.

In the main image-processing board 400, the electronic data is processed as 8-bit electronic image data by the multivalued-image processing portion 402 according to a predetermined procedure.

The 8-bit electronic data is transferred from the main image-processing board 400 (through the connector 405) to the sub image-processing board 500 (through the connector 505). Then the data is subjected to error diffusion processing and converted into 2-bit (binary) electronic image data in a multivalued image-to-binary image conversion portion of a binary image processing portion 501.

The conversion of 8-bit electronic image data into 2-bit electronic image data with error diffusion processing is conducted in such a way that the image may not suffer deterioration of its quality. The conversion may bring an advantage of saving the memory capacity of the system.

The binary-bit electronic image data of each original is transferred to and temporarily stored in a hard disk memory 503.

When all original documents put on the RADF 16 were fed and read by the scanner, the binary-bit electronic image data stored in the hard disk 503 is read out repeatedly by the required number of copies under the control of the gate array control and transferred again to the main image-processing board 400 through the connectors 405 and 505. The data is subjected to gamma correction on the board 400 and then transferred to the laser writing unit 26 through the laser control portion 404.

Although the embodiment is intended to repeatedly read a set of the images by the desired number of copies after having read and stored all original document images, it may be modified to output first series of images just after a set of images to be copied first has been prepared.

The original image read by the scanner section 11 of the digital copying machine 10 is output as a copy image having a gradation from the laser recording portion 12.

(Printer Mode)

An image transmitted over a network from an external terminal (e.g., a personal computer) connected thereto is developed to a unit-page image on the printer board 601 and then transferred through the interface SCSI 504 to the sub image-processing board 500 wherein the data is stored in the hard disk memory 503.

The image developed to a page image on the printer board 601 is transferred to the sub image-processing board 500 wherein it is not subjected to binary image processing and is temporarily stored in the hard disk memory 503.

The binary image processing is not made on the page image when being read from the hard disk memory 503.

The page images stored in the hard disk 503 are read therefrom in the order of specified page numbers and transferred to the main image-processing board 400 wherein they are subsequently subjected to gamma correction. The laser control 404 controls the laser unit (LSU) 26 for writing the images to be reproduced.

(Facsimile Mode)

The facsimile mode includes processing for transmitting an original image to a remote communication party and processing for receiving an original image from a remote communication party.

The procedure of transmitting original images to the remote terminal is described first as follows:

Originals (separate sheets of a document) set on the RADF 16 are automatically fed one by one to a document setting table 15 of the scanner unit 20. Each original image is read and converted by the scanner unit 20 into 8-bit electronic data that is then transferred to the main image-processing board 400.

In the main image-processing board 400, the electronic data is processed as 8-bit electronic image data by the multivalued-image processing portion 402 according to a predetermined procedure.

The 8-bit electronic data is transferred from the main image-processing board 400 (through the connector 405) to the sub image-processing board 500 (through the connector 505). Then the data is subjected to error diffusion processing and converted into 2-bit (binary) electronic image data in a multivalued image-to-binary image conversion portion of a binary image processing portion 501.

The conversion of 8-bit electronic image data into 2-bit electronic image data with error diffusion processing is conducted in such a way that the image may not suffer deterioration of its quality. The binary-bit images of the originals to be transmitted are compressed in a specified format and stored in the memory 502.

After establishment of communication line with the remote party, the original images compressed in the specified format are read from the memory 502 and transferred to the facsimile board 603 wherein the images are subjected to necessary processing (e.g., changing of a compression format) and successively transmitted to the party over the communication line.

The procedure of processing original images received from a remote terminal is as follows:

A series of original document images transmitted over a communication line from a remote terminal is received by the facsimile board 603 that establishes first the communication condition and then receives the original document images. The received images compressed in a specified format are transferred to the binary image processing portion 501 through the interface from the sub image board 500. The transmitted images are reproduced as respective page images by using a companding device provided thereat.

The reproduced original page images are transferred to the main image-processing board 400 wherein they are successively subjected to gamma correction. The laser control 404 controls the laser unit 26 for writing the images to be reproduced.

As described above, the image processing portion for conducting the specified processing of image information is constructed of two separated image-processing boards, one of which is a main image-processing board 400 for processing an original document image inputted through a scanner portion 11 in the form of multivalued image-information and the other is a sub image-processing board 500 for conducting the specified processing (including multivalue-to-binary conversion) of the multivalued image information transferred from the main image-processing board 400 and the specified processing of image information received from any external terminal through an external interface and then transferring the information to the multivalued image-processing portion (of the main image-processing board).

The main image-processing board 400 includes a laser control 404 that controls a laser writing unit 26 to write image information for reproducing an image on a light-sensitive body 28 in the electrophotographic process.

In the above construction of the image processing portion, an original image scanned by the scanner unit 31 can be reproduced as a high-quality copy of the original image maintaining the feature of the multivalued image by laser recording portion 12. High speed output of a large number of original images can be carried out by using electronic reading function with sub image-processing board 500 and a hard disk memory 503.

Image information received from an external device (e.g., a facsimile and a printer) and, particularly, processed multivalued images (holding the feature of the originals) transmitted from an external facsimile can be processed suitably (including conversion of multivalued images into binary images) using the various kinds of functions featuring the digital copying machine 10.

The divided construction of the image processing portion makes it possible to line up many variations of the digital copying machines 10 to meet the users' needs. It is also possible to easily expand the system of the digital copying machine 10 working at the user's request.

The central processing unit 401 disposed on the main image-processing board 400 controls the sub image-processing board 500 in a whole system described before to achieve the consistency of sequential operations of respective processing portions, realizing a smooth flow of data and processing steps on respective portions of the machine (without missing any image data).

The present invention can offer the following advantages:

The division of image processing section (in the form of separate image-processing boards) according to levels or contents of image processing realizes simplified arrangements for control of processing steps and data flows in the respective image-processing portions, achieving effective processing of the image information.

The provision of functional options (in the form of boards) realizes the supply of digital copying machines to meet the requirements of the market and individual users. This enables users to obtain the digital copying machines provided with only desired functions at a least expense.

Furthermore, the above concept allows makers to easily offer a wide selection of the goods from a standard machine having the minimum necessary functions to a high-grade machine provided with the maximum of functions. This eliminates the need for using specially designed processing boards.

It is also of a great advantage for users to save an initial cost by selecting a basic machine containing the minimum necessary image-processing boards that usually take a large portion of the cost of the components of the machine.

Especially the image-processing device according to an aspect of the present invention uses two separate image-processing boards one of which is a main image-processing board for conducting the specified processing of the image information input from a scanner and outputting an image from a printer and the other is a sub image-processing board for conducting the particular processing of the image information transferred from the main image-processing board. This division is made in accordance with levels and contents of processing operations, thus realizing a simplified arrangement for control of processing steps and data flows in the image processing device and attaining effective processing of the image information.

The image-processing device according to another aspect of the present invention is further featured in that the main image-processing board has a control portion that controls image-data writing by the recording portion to output the reproduced image from a recording section. This enables the main image-processing board to process the electronic image data in a multivalued form and output the reproduced image through a laser recording portion. Namely, it is possible to provide the standard digital copying machine that can reproduce a high-quality image of an original read by a scanner.

The use of the main image-processing board provided with minimum necessary functions realizes an inexpensive standard digital copying machine with a reduced cost of the image processing portion that usually takes a large portion of the cost of the machine. The standard machine is also capable of freely extending its processing performace by adding desired options.

The image-processing device according to another aspect of the present invention is featured by the provision of a central processing unit (CPU) on its main image-processing board, which device controls a sub image-processing board to assure smooth and reliable control of the image information while processing the main and sub boards. Both the boards operate in synchronism with each other by being controlled from the same clock, realizing smooth transfers of the image information between them.

The image-processing device according to another aspect of the present invention is further featured in that the main image-processing board processes image information of a multivalued image and the sub image-processing portion processes image information of a binary image. This feature can simplify the control of data processing operations and data flows, assuring effective processing image information.

This enables makers to easily line up a variety of digital copying machines by incorporating main image-processing board only for conducting the processing multivalued image information and by incorporating the main image-processing board for processing multivalued original image information and outputting the high-quality of reproduced image and the sub image-processing board for processing binary image information for use in a facsimile and a printer.

The image-processing device according to another aspect of the present invention is featured in that the sub image-processing board processes image information for use in a facsimile or a printer to easily meet the user's requirements without any additional expense.

Recent models of digital copying machines are featured by the ability to process image information transmitted over a communication line from an external device in the facsimile mode or the printer mode besides or, sometimes, in parallel with processing image information read in the copy mode. The use of the separate image-processing boards can assure the smooth control of processing and transfers of image information in respective modes.

What is claimed is:

1. An image processing device comprising:
  input means for directly inputting from at least one original image first image information in a first form, said first image information being representative of said at least one original image;
  first image-processing means for specified processing of said first image information so as to generate first processed image information in said first form;
  image information reception means for receiving from an external source second image information in a second form, said second image information being representative of at least one image;
  image storage means for storing image information in said second form;
  second image-processing means (i) for further specified processing of said first processed image information so as to generate first resultant image information in said second form, and (ii) for specified processing of said second image information so as to generate second resultant image information in said second form;
  transfer means for transferring said first resultant image information and/or said second resultant image information from said second image-processing means to said image storage means for storage; and,
  image information reproducing means for selectively reproducing images from said first resultant image information and from said second resultant image information stored by said storage means.

2. An image processing device as defined in claim 1, wherein said second image-processing means includes converting means for converting image information in said first form into image information in said second form.

3. An image processing device as defined in claim 1, wherein:
  said image information in said first form is multi-valued image information; and
  said image information in said second form is image information in binary form.

4. An image processing device as defined in claim 1, wherein said second image-processing means includes at least one means for image information compression/decompression.

5. An image processing device as defined in claim 2, wherein:
  said input means comprises at least one image reader;
  said image reader outputs said first image information in multi-valued image information form;
  said converting means converts said first image information in multi-valued image information form to said first resultant image information in binary form; and said first resultant image information is transferred to said storage means for later use.

6. An image processing device as defined in claim 1, wherein:

said second image-processing means receives and processes said second image information in binary image information form; and said second resultant image information is generated and transferred to said storage means in binary image information form.

7. An image processing device comprising:

input means comprising at least one image reader for directly inputting from at least one original image first image information in multi-valued form, said first image information being representative of said at least one original image;

first image-processing means for specified processing of said first image information so as to generate first processed image information in multi-valued form;

image information reception means for receiving from an external source second image information in binary form, said second image information being representative of at least one image;

image storage means for storing image information in said binary form;

second image-processing means (i) for further specified processing of said first processed image information so as to generate first resultant image information in binary form, and (ii) for specified processing of said second image information so as to generate second resultant image information in said binary form;

transfer means for transferring said first resultant image information and/or said second resultant image information from said second image-processing means to said image storage means for storage; and, image information reproducing means for selectively reproducing images from said first resultant image information and from said second resultant image information stored by said storage means.

\* \* \* \* \*

UNITED STATES PATENT AND TRADEMARK OFFICE
CERTIFICATE OF CORRECTION

PATENT NO. : 6,483,598 B1
DATED : November 19, 2002
INVENTOR(S) : Atsushi Narukawa et al.

It is certified that error appears in the above-identified patent and that said Letters Patent is hereby corrected as shown below:

<u>Title page,</u>
After Item [22], please add:

-- [30]     Foreign Application Priority Data

October 17, 1997   (JP)   Japan.... 9-285390 --

Signed and Sealed this

Twenty-ninth Day of July, 2003

JAMES E. ROGAN
*Director of the United States Patent and Trademark Office*